United States Patent [19]
Jafri et al.

[11] Patent Number: 5,832,454
[45] Date of Patent: Nov. 3, 1998

[54] RESERVATION SOFTWARE EMPLOYING MULTIPLE VIRTUAL AGENTS

[75] Inventors: Vajid H. Jafri; Sajid H. Jafri, both of Flower City, Calif.

[73] Assignee: Docunet, Inc., South San Francisco, Calif.

[21] Appl. No.: 547,477

[22] Filed: Oct. 24, 1995

[51] Int. Cl.$^6$ .................................................. G06F 17/60
[52] U.S. Cl. ...................................................... 705/6; 705/5
[58] Field of Search .................................... 395/205, 206, 395/209; 705/5, 6, 9

[56] References Cited

U.S. PATENT DOCUMENTS

| | | | |
|---|---|---|---|
| 5,191,523 | 3/1993 | Whitesage | 395/206 |
| 5,237,499 | 8/1993 | Garback | 395/205 |
| 5,311,425 | 5/1994 | Inada | 395/206 |
| 5,467,268 | 11/1995 | Sisley et al. | 395/209 |
| 5,570,283 | 10/1996 | Shoolery et al. | 395/205 |

*Primary Examiner*—Edward R. Cosimano
*Assistant Examiner*—Barton L. Bainbridge
*Attorney, Agent, or Firm*—Burns, Doane, Swecker & Mathis, L.L.P.

[57] ABSTRACT

A reservation program provides for greater speed and ease of use than has been possible with existing systems. In a typical implementation, the reservation software is run on a personal computer connected to a server node through a dial up line. The server node is in turn connected to a computer reservation system such as SystemOne, Apollo, Sabre, etc. Using embedded rules, the program and its transparent server node combine user inputs and preferences to extract options in real time for near-immediate presentation to the user of multiple priced itineraries. In one embodiment, the user is offered three priced itineraries from which to make a choice. Offering multiple priced itineraries minimizes user frustration and obviates the need for multiple tries to get the desired booking. Overlapping of operations enables the reservation software to present priced itineraries to the user within a short time of the user completing his or her travel request. In one embodiment, the network is working even while the user is finalizing the route of travel. The reservation software may be used to make complete travel arrangements including airline, hotel and car reservations.

5 Claims, 8 Drawing Sheets

RESERVATION SOFTWARE EMPLOYING MULTIPLE VIRTUAL AGENTS

1. Field of the Invention

The present invention relates to reservation software, particularly to software for making airline and related travel reservations.

2. State of the Art

In a service oriented industry, such as the travel industry, offices must be staffed with trained and experienced reservation agents to work on a one-on-one basis with phone-in customers. Often, time spent by such personnel servicing customer calls is stressful and results in inefficiencies, since advice, information and quotations given to the customer may nevertheless not result in a sale. The customer too is in a hurry, but is often required to keep track of multiple departure and arrival times, flight numbers of various airlines, check-in and check-out of different hotels, car reservations, etc., often referring back to similar arrangement made during previous trips. As a result, the overall process is time consuming and frustrating for both the traveler and the agent. Time and energy is wasted for both the industry as a whole and for consumers, thereby increasing the cost of such services.

An emerging market in the travel industry is the market for on-line software that provides the user access to the airlines's databases, the same databases that the travel agents access through their screens. Although there are some on-line services such as CompuServe, Prodigy and America On-line that provide access to the airline databases, the complexity of navigating one's way through the on-line service menus and the complicated screen presentations of the airlines have hindered the explosive growth that had been predicted for this sector. Furthermore, present reservation software typically requires a user to select a flight before viewing the fare. Known reservation systems and travel planning tools are described in U.S. Pat. Nos. 4,862,357 and 5,021,953, both of which are incorporated herein by reference.

There remains a need for reservation software that transcends presently available products in consumer ease of use, speed and effectiveness.

DISCLOSURE OF THE INVENTION

The present reservation software provides for greater speed and ease of use than has been possible with existing systems. In a typical implementation, the reservation software is run on a personal computer connected to a server node through a dial-up or dedicated line. The term "personal computer" is used herein to refer to any of a variety of computers that are primarily single-user machines, including IBM-compatible computers, Apple Macintosh™ and Power PC™ computers, etc. The server node is in turn connected to a computer reservation system such as SystemOne, Apollo, Sabre, etc. Of course, other architectures are also possible. For example, the server node may be incorporated into the computer reservation system.

Using embedded rules, the program and its transparent server node combine user inputs and preferences to extract options in real time for near-immediate presentation to the user of multiple priced itineraries. In one embodiment, the user is offered three priced itineraries from which to make a choice. Offering multiple priced itineraries minimizes user frustration and obviates the need for multiple tries to get the desired booking.

Overlapping of operations enables the reservation software to present priced itineraries to the user within a short time of the user completing his or her travel request. In one embodiment, the network is working even while the user is finalizing the route of travel.

BRIEF DESCRIPTION OF THE DRAWING

The present invention may be further understood from the following description in conjunction with the appended drawing. In the drawing.

BEST MODE OF CARRYING OUT THE INVENTION

A method of using the present reservation software will first be described, followed by a description of the hardware environment in which the reservation software may be used and a description of the data processing performed by the reservation software.

After the reservation software has been installed, registered and configured for communications with the server node, the user may use the reservation software to make reservations. The user is first prompted to identify the traveler or travelers. The program then checks to see if a profile has been created and stored for the first-named traveler. If not, the user is prompted to enter in a point and click fashion various information concerning the travelers preferences, including, for example, seat preference (window or aisle), smoking or non-smoking, airline preferences with frequent flyer numbers, hotel and car preferences, and other information including address, phone numbers, passport information, etc.

The user then specifies in sequence each leg of the desired trip, again in point and click fashion. Once the first leg of a trip has been specified, a communications function is invoked to establish communications with the server node. The process of building itineraries, described in detail hereinafter, is then begun.

After the user has entered the last leg of the trip, the user presses a screen button to indicate to the program that the trip has been completely specified. Alternatively, the program may recognize when the destination city is the same as the first originating city. The program then completes processing of the itineraries, prices the itineraries, and displays the priced itineraries for selection by the user.

The program then uses profile values to offer car and hotel selections. The user may then book cars and hotels through the same kind of point and click actions.

When the user has selected an itinerary, the itinerary is sent electronically, again by modem connection, to a travel agent designated in a secure area of the traveler's profile. The travel agent may perform additional quality control on the itinerary and then, if the itinerary is acceptable, issue tickets accordingly. To simplify issuance, default values are already filled in from the profile entered by the user and from the airline reservation, including, for example, city, pickup/check-in date, drop-off/check-out date, type of car, hotel, etc.

Figure 1:
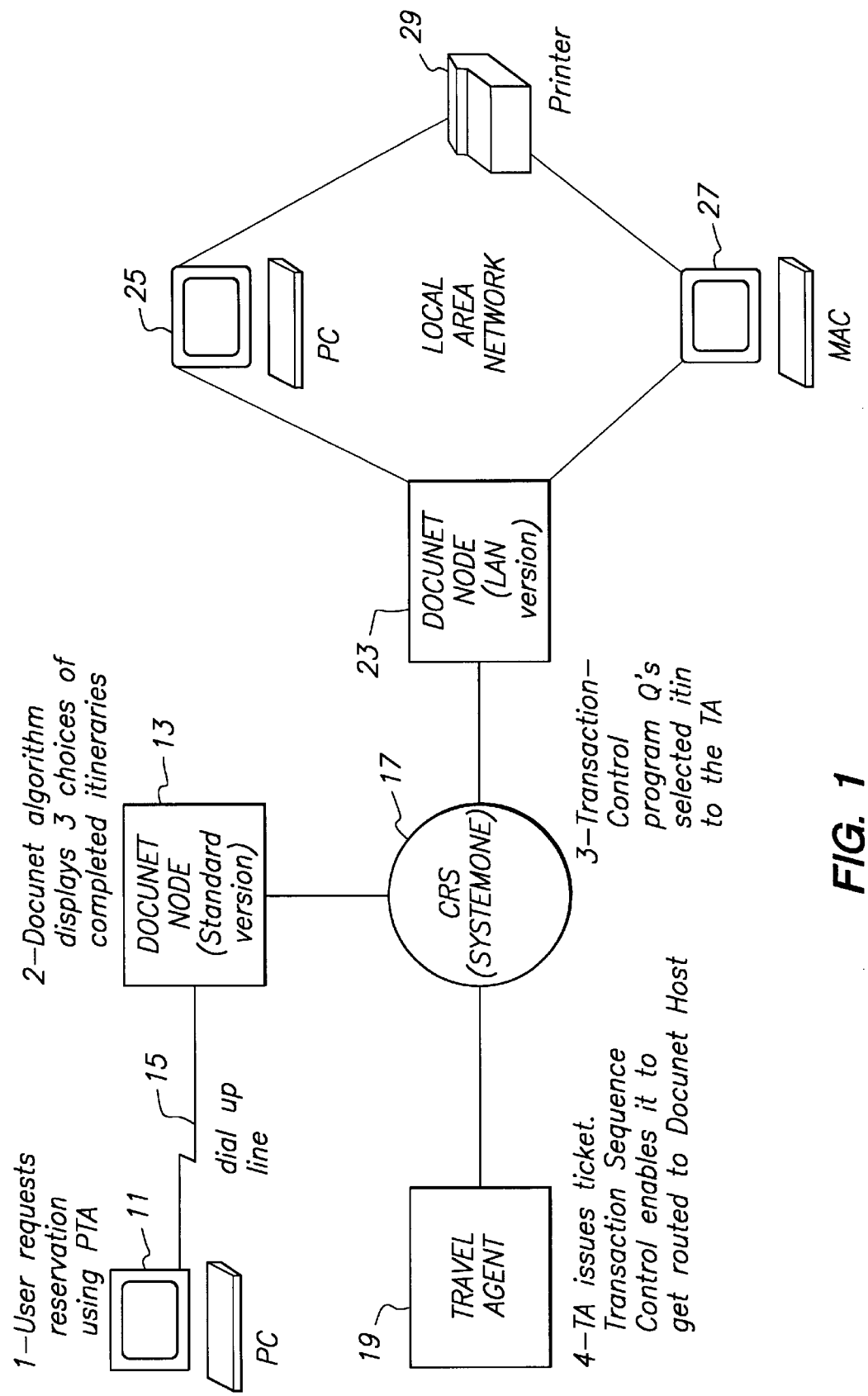
FIG. 1 is system-level block diagram of a computer network system in which the present invention may be used.

Referring now to FIG. 1, the overall architecture of a system in which the present reservation software may be used will be described. In an exemplary embodiment, the reservation software runs on a standard Windowsbased or other PC 11 equipped with a modem or a digital data line. Using appropriate communications software, the PC is connected through a dial up or dedicated line 15 to a server node 13 running a standard version of the present reservation software.

The reservation system allows the user access to the airlines's databases, the same databases that the travel agents access through their screens. For this purpose, the server node is connected to a computerized reservation system (CRS) 17, for example SystemOne or other similar CRS. Also connected to the CRS are travel agents, including a travel agent 19 designated in the profile of the traveler, and further server nodes such as a server node 23. The server node 23, for example, may run a LAN version of the reservation software and may serve as a network server for a network including various types of computing resources, such as a PC 25, a Macintosh computer 27, a printer 29, etc.

In operation of the system of FIG. 1, the user first requests a reservation using the present reservation software. The server node then displays multiple (e.g., three) completed and priced itineraries for selection of one by the user. After the user has made his or her selection, a transaction control program queues the selected itinerary for communications to the traveler's travel agent. The travel agent then issues a ticket.

Figure 2:
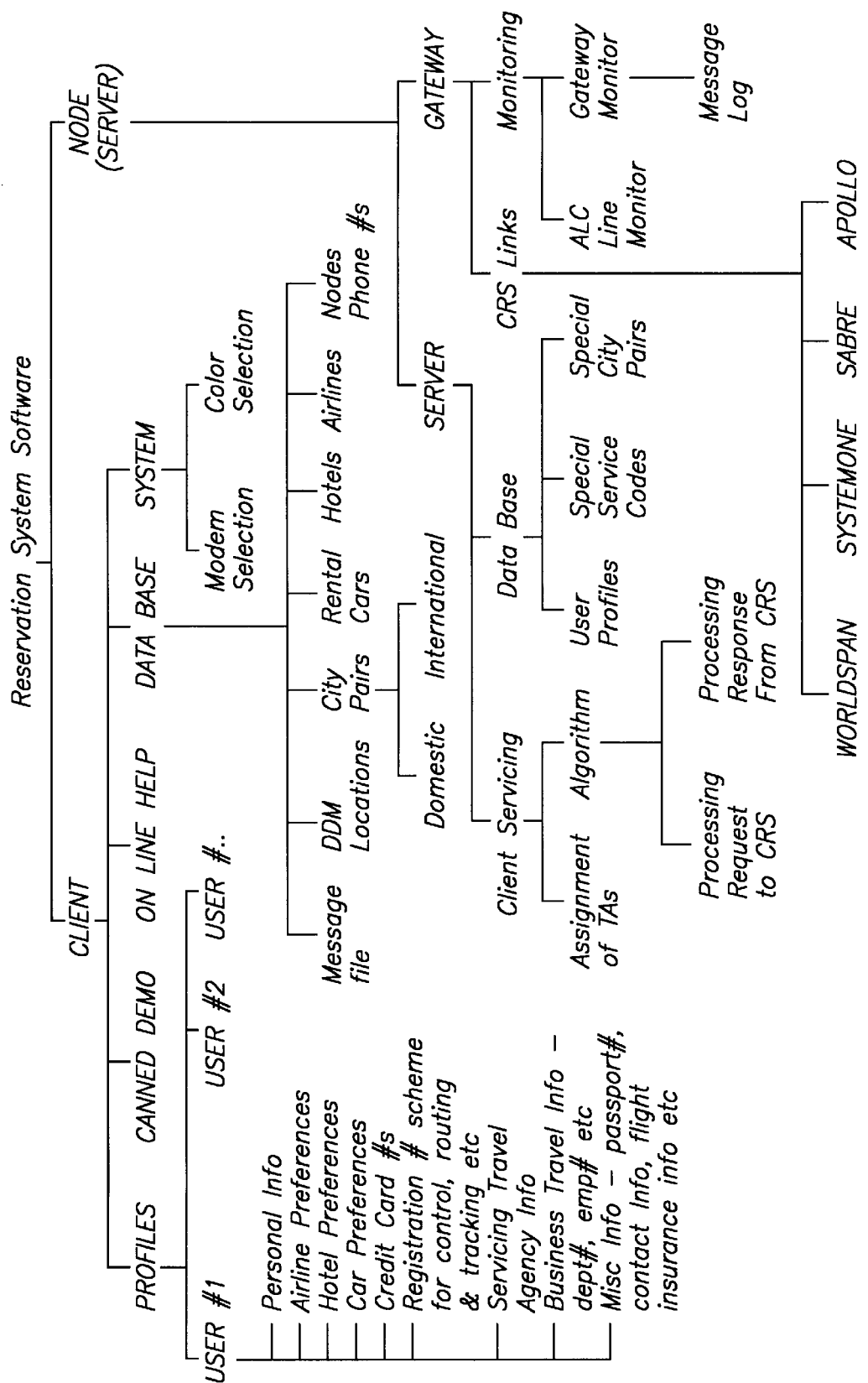
FIG. 2 is a block diagram showing the principal software components of the present reservation software, including both components employed within the PC and components employed within the node of FIG. 1.

The principal software components of the system of FIG. 1 are shown in FIG. 2. Referring to FIG. 2, software for the reservation system includes Client-side software and Server-side software. On the Client side, software components include files containing user profiles of the type described previously, a canned demonstration program, on-line help files, data base files providing interaction between the user and the CRS data bases, and system files relating to system hardware, including modem selection and screen display color selection.

The data base files relate primarily to displaying selections to the user to solicit the user's input and displaying resulting availability information to the user, translating as necessary between the information seen by the user and the information seen by the CRS. The City Pairs, Rental Cars, Hotels and Airlines files are of this type. The City Pairs files include files specifying both domestic cities and international cities. In addition, the data base files include various files relating to system administration. A Message file is used to store messages to the user as appropriate. For example, no flight may be found in response to the user's request. A message would then be retrieved from the Message file and displayed to the user asking the user to choose a different departure date or time. A Nodes Phone Numbers file allows a dial-up connection to be established between the Client and one of various Server nodes. Finally, a DDM Locations file may be used to allow the user to instruct that the ticket be delivered via a local Document Delivery Machine (DM) of a type operated by the present assignee. A DDM is similar to an ATM but may be used to deliver documents other than cash.

Referring still to FIG. 2, on the server side, files include Server files, relating to interaction with the Client, and Gateway files, relating to interaction with the CRS. The Server files include Client Servicing files, in particular files relating to the assignment of Terminal Addresses (TA) used to access the CRS and files relating to the algorithm used to process travel requests, including processing the request to the CRS and processing the response from the CRS. The Server files also include data base files. Within this category are user profiles stored in the server. In addition, a number of miscellaneous details are handled by Special Service Code files and Special City Pairs data base files. The Special Service Code files account for variations (primarily with respect to international flights) between different airlines in designating different classes of service. For example, "M Class" may mean different things on a Lufthansa international flight as compared to an American Airlines international flight. The Special City Pairs files account for differences in requests for airline flights as opposed to other accommodations. For example, a user may specify JFK (i.e., John F. Kennedy International Airport) as the desired destination but will most likely wish to choose from a broader range of accommodations than might be available in the immediate airport environs. For purposes of hotel accommodations, JFK might then be changed to NYC, to refer to New York City at large.

The Gateway files include files for establishing links to various CRSs, e.g., Worldspan, SystemOne, Sabre, Apollo, etc., and files for monitoring connection and line status. A Gateway Monitor includes a Message Log that is used to maintain a running history of activity between the server and the CRSs. An ALC (Asynchronous Line Communications) Monitor monitors whether a line is active, slow, fast, etc.

Figure 3:
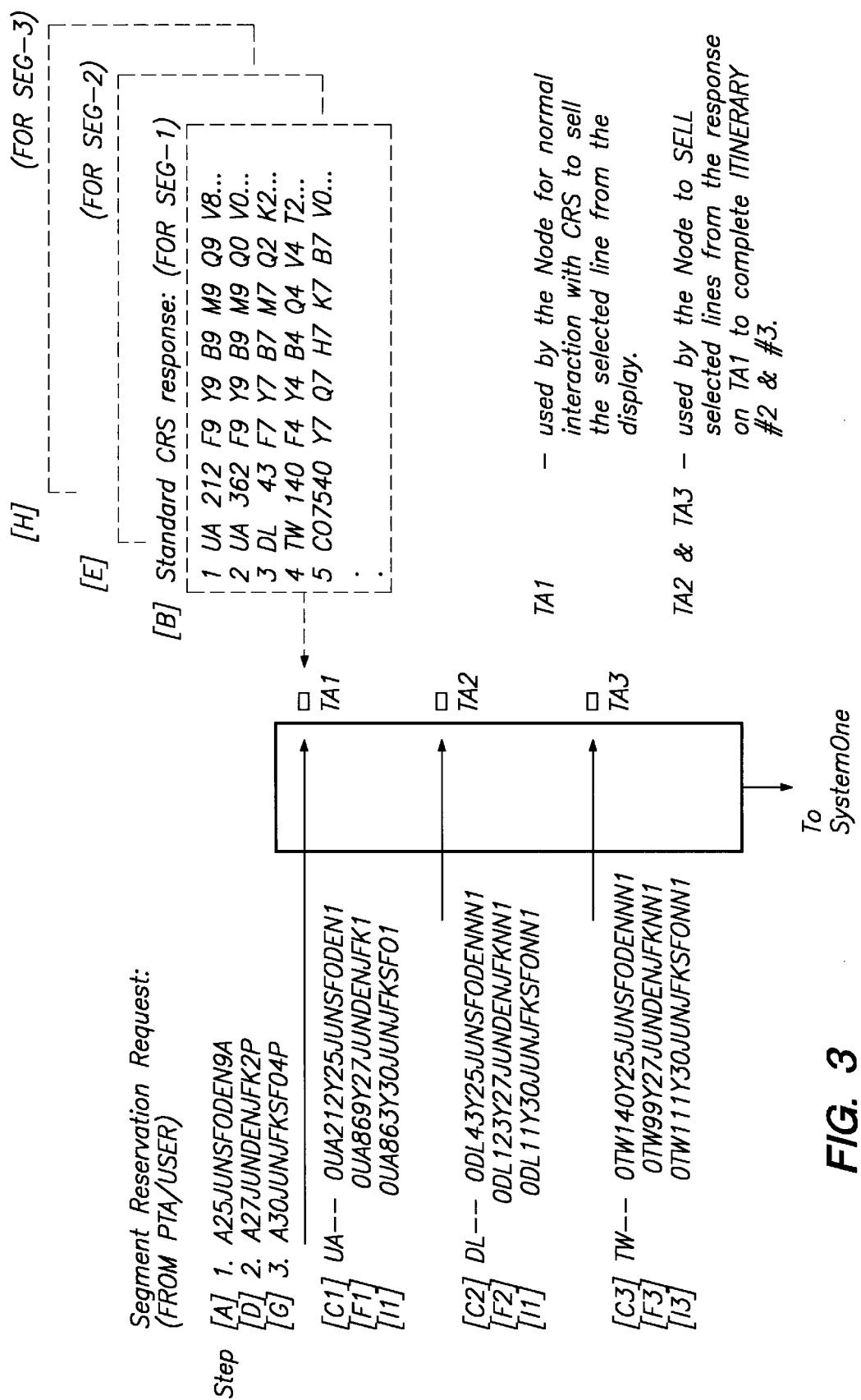
FIG. 3 is a diagram illustrating a sequence of processing events within the node of FIG. 1.

The present invention focuses particularly on the interaction of the CRS 17 with the PC through the transparent server node to display multiple priced itineraries for selection by the user. Referring to FIG. 3, the sequence of events and operations performed within the server node are represented in diagrammatic form. Consecutive steps are indicated by consecutive letters ([A], [3], etc.), while concurrent steps are indicated by the same letter followed by different consecutive numbers ([C1], [C2], [C3], etc.).

Connections to the CRS are referred to as "Terminal Addresses," or TAs. A first TA, TA1, is used by the node for normal interaction with the CRS to complete a first itinerary, Itinerary 1. In response to the interaction on TA1, the node receives from the CRS information which would normally be displayed on a travel agent's screen in standard numbered-line format. The second and third TAs, TA2 and TA3, are used to, in CRS parlance, sell selected lines from the response on TA1 to complete Itinerary 2 and Itinerary 3. Of course, in other configurations, the number of TAs and the number of itineraries built may be different than three, for example two or four or more.

In Step[A], the node receives from the user information specifying the first segment of the desired trip, and the node relays the user's request to the CRS in the expected format on TA1. In the example shown, the user wishes to fly on June 25 from San Francisco to Denver departing at 9 AM. In response, the CRS returns information for the first segment in the usual format (Step[3]). At a typical terminal of the type used by travel agents, a screen display would be displayed, listing possible flights for the requested segment, with direct flights departing near the requested departure time being listed first. Each screen display will list some number of possible flights, typically about six or eight. Further screen displays may be requested if desired.

According to embedded rules programmed within the node, up to three flights (more generally, m flights) are selected from the CRS data corresponding to some number n of display screens for segment 1. Flights are selected in accordance with user preferences as stored in the reservation software. For example, the user may have specified best fare. In this instance, flights will be selected having seats available in coach class ("Y-Class") or special fares lower in cost than standard Y-Class and appearing to right of Y-Class. Business Class and First Class seats appear to the left of Y-Class, in increasing order of comfort and service proceeding from Y-Class toward the left.

In the example shown, lines 1, 3 and 4 are selected, corresponding to flights on United Airlines (UA), Delta Airlines (DL) and TransWorld Airlines (TW), respectively. In order to obtain the best fares, the node thereafter attempts to complete Itinerary 1 on United Airlines using TA1, Itinerary 2 on Delta Airlines using TA2, and Itinerary 3 on TransWorld Airlines using TA3.

Therefore, in Step[C1], the node reserves a seat in Y-Class on United flight 212. Similarly, in Step[C2], the node concurrently reserves a seat in Y-Class on Delta flight 43, and reserves a seat in Y-Class on TWA flight 140.

The foregoing process is then repeated for each segment of the trip. In Step[D], the node receives from the user information specifying the second segment of the desired trip, and the node relays the user's request to the CRS in the expected format. In the example shown, the user wishes to fly on June 27 from Denver to New York departing at 2 PM. In response, the CRS returns information for the second segment in the usual format (Step[E]).

Again, three different flights are selected, giving preference in each instance to a flight on the same airline as the first flight selected on a particular TA. Hence in Step[F1], Step[F2] and Step[F3], respectively, the node reserves a seat in Y-Class on United flight 869, reserves a seat in Y-Class on Delta flight 123, and reserves a seat in Y-Class on TWA flight 111.

The foregoing process is repeated one or more additional time for a third segment (Steps [G], [H], [I1], [I2] and [I3]) and any additional segments.

Notice that processing of the three itineraries proceeds in parallel, thereby greatly accelerating the reservation process. Notice further that processing is begun as soon as the first segment of the trip has been specified. Assuming that processing for a segment may be accomplished in approximately the same time T as it takes the user to input a segment, this overlapping of processing within the node with the user inputting further segments allows the delay perceived by the user to be reduced to 1T+ΔT instead of NT+ΔT, where N is the number of segments and ΔT represents the additional time required after processing the last segment to price and display the itineraries. After the user has selected a priced itinerary, car and hotel reservations may also be booked as part of the same process. In a preferred embodiment, the whole process of booking air, car and hotel reservations, on the average, takes no more than about three minutes. This time is a dramatic improvement over existing systems, which often require 20 or more minutes to make often less than-satisfactory arrangements, if any.

The selection process performed within the node does not guarantee the absolute lowest fare. Rather, the selection process has been demonstrated to give reasonably low fares satisfying the most common user preferences. For example, some users may tolerate considerable inconvenience in terms of flight times and the number of connecting flights in order to get the best possible price. For the average user, however, convenience is more important than savings where those savings are not liable to be dramatic.

The selection process will now be described in greater detail.

Figure 4A:
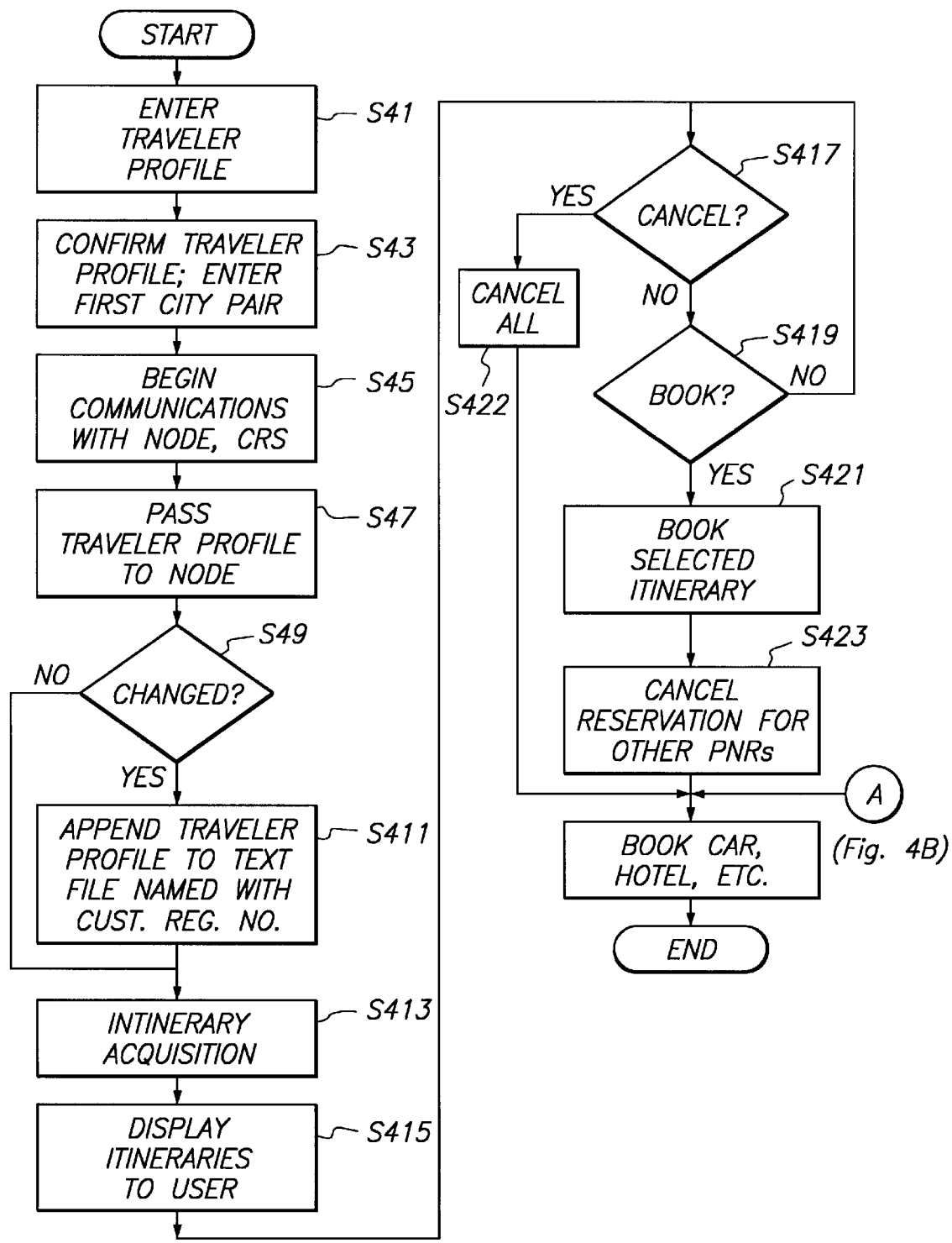
FIG. 4A through FIG. 4D are flow charts of reservation processing.

The reservation software includes a client program running on the PC and a server program running on the node. The reservation software client program will automatically initiate communications with the CRS without user interaction. In particular, when the client program is launched, the user is first presented with a Travel Request dialog showing a Traveler Profile either for the last user or for a selected user. If the client program is being used for the first time, the traveler information will be blank. Referring to FIG. 4A, if the Traveler Profile is either blank or not correct, the user then enters the correct traveler information (Step S41). The user confirms the Traveler Profile before proceeding to enter the first segment of the travel request (Step S43). Each segment of the travel request is entered on a separate City Pair line. After the user enters the first travel segment in the dialog box provided, communications with the node will commence (Step S45).

After communications are established, the reservation software will pass the Traveler Profile to the node (Step S47) to be used as a basis for a CRS Passenger Name Record (PNR). A PNR is the basis of the reservation within the CRS, as is well-known in the art. If the Traveler Profile has changed since the last connection with the node (Step S49), the node will also append the Traveler Profile to a text file named with the customer registration number (Step S411) for use by the travel agent. The customer registration number is entered during initial registration of the reservation software (not shown).

The process that follows is referred to as "Itinerary Acquisition" (Step S413), described in greater detail hereinafter.

Following Itinerary Acquisition, the resulting itineraries are displayed to the user (Step S415). At this point, the user may either accept and book one of the itineraries or may reject all of the itineraries. In Step S417, if a Cancel button is activated, then all of the reservations are canceled (Step S422). If instead the Book Itinerary button is activated (Step S419), a request is generated to the CRS to book the selected itinerary (Step S421) and to cancel reservations for the other PNRs (Step S423).

After airline reservations have been completed, car and hotel reservations may be made in a similar manner.

Figure 4B:
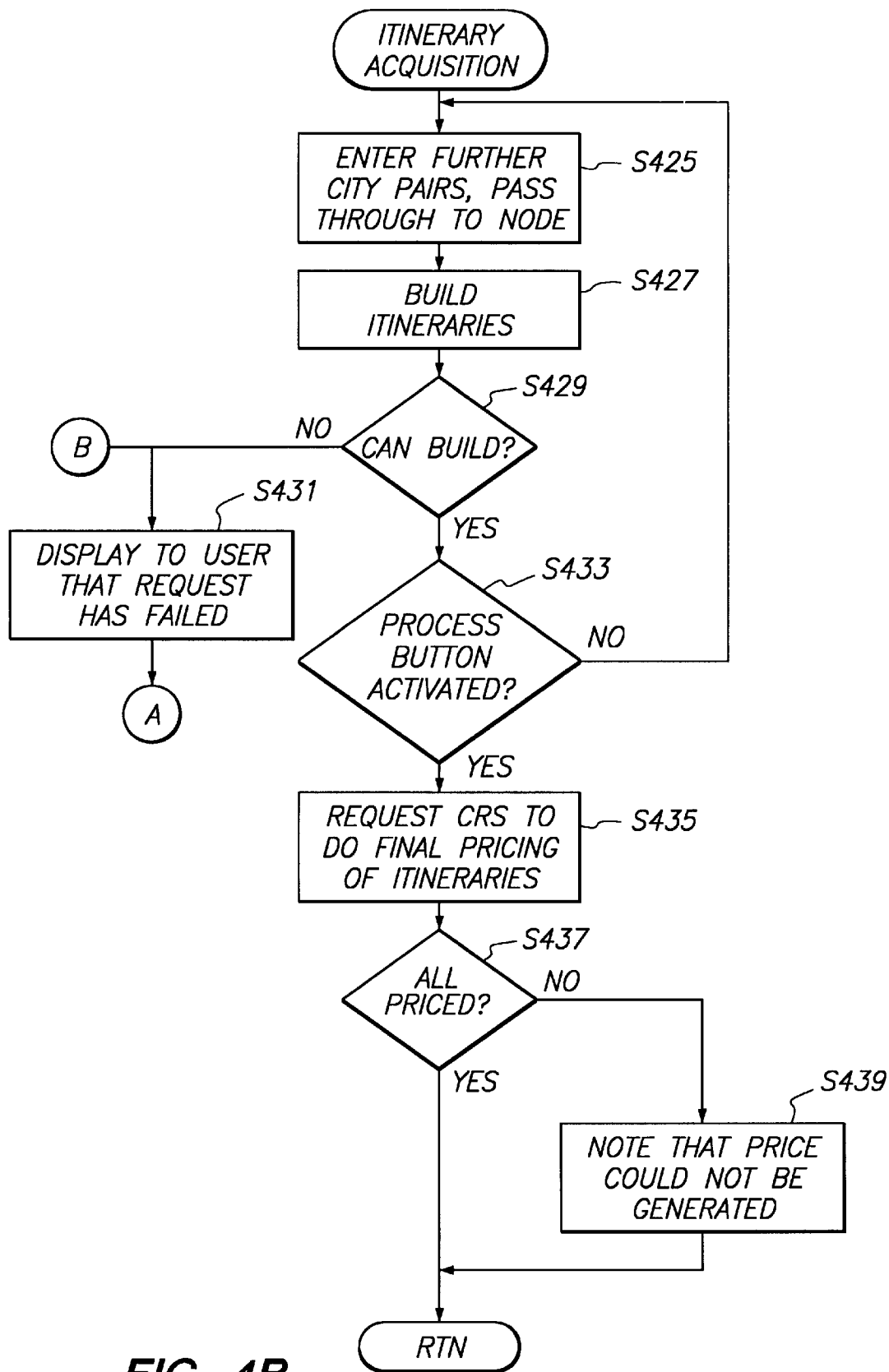

Referring to FIG. 4B, Itinerary Acquisition will now be described in greater detail. After completion of the first City Pair line, all further City Pairs needed to complete the Travel Request will be passed to the CRS so that delays in response of the user interface to user actions are minimized. The passing of information through the Application Program Interface (API) of the client program is automatically initiated and processed without user interaction (Step S425). The node then proceeds with an Itinerary Building phase (Step S427). If at any time during the Build Itineraries step it is determined that no itinerary can be built (Step S429), a corresponding message is displayed to the user (Step S431). Assuming an itinerary can be built, no further user interaction is required until a final pricing phase of Itinerary Acquisition. The final pricing phase commences after the user presses a "Process Request" button displayed in a Travel Request dialog. As long as the "Process Request" button has not been activated (Step 433), the user may continue to add additional segments to the Travel Request (Step S425), with these segments being automatically passed to the node and incorporated into the Itinerary Building process (Step S427). After the "Process Request" button has been activated (Step 433), the final pricing phase is begun, and the CRS is requested to price the itineraries that have been built (Step 435).

It may happen that the CRS will not price every one of the itineraries. If so, this condition is detected in Step S437, and a corresponding message is generated to the user (Step S439) to inform the user that an itinerary could not be priced.

Figure 4C:
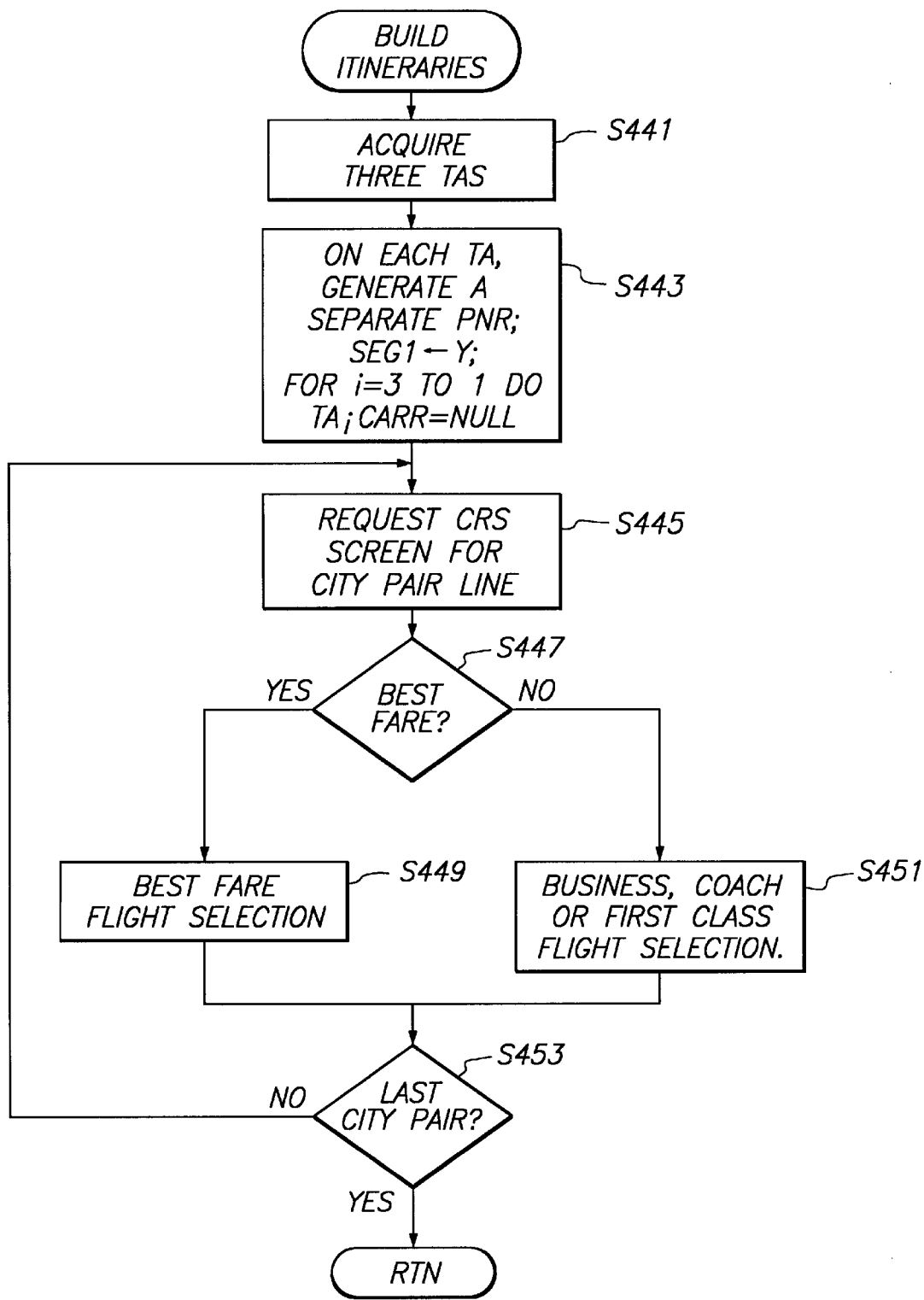

During Itinerary Building, the server node software uses the following rules to build up to some number of itinerary options (e.g., three). Referring to FIG. 4C, first, three host Terminal Addresses (TAs) are acquired to speed host communications (Step S441). On each TA, the software generates a separate Passenger Name Record (PNR) from the Traveler Profile (Step S443). Each PNR will include, in a Remark portion of the Name field, the user's registration number that will have been entered during registration of the program. Also in Step S443, a flag SEG1, used if Best Fare has been specified, is set to one, and carrier values for the first segment for each of the TAs are initialized to NULL. During Best Fare flight selection, a record is kept of the carrier for the first segment for each of the TAs.

Thereafter, for each City Pair line entered by the user, the software requests some number m of CRS availability displays. The software attempts to choose three flight options. For segments other than the first segment, the software attempts to choose three flights options on the same airlines as previously chosen, if possible. Each one of the chosen flight options is placed on one of the PNRs that have been generated at the CRS on the three TAs.

More particularly, in Step 445, the software requests a CRS availability screen for the first City Pair line. From the first CRS availability display generated by the first City Pair line, the first three flights presented in the display that have seats available in the desired travel class will be selected as the three alternatives for the first segment of the itinerary, with the further qualification that flights are selected on three different airlines if possible. For a flight to be considered as a candidate for itinerary selection, seats must be available in the desired class. If no seats are available on a flight, that flight will be eliminated from the selection process and the next possible flight from the availability that does have seats will be chosen.

The flights selected will depend on seat availability in the desired class, "Best Fare," "Coach Class," "Business Class," or "First Class." The desired class will have been entered as part of the Traveler Profile. Whether or not Best Fare is desired is checked in Step S447. Best Fare requires additional processing steps as compared to Coach Class, Business Class and First Class. Depending on whether Best Fare has been specified, flight selection then proceeds in accordance with Step S449 or Step S451. The Build Itineraries step continues until the Process Request button has been pressed, indicating the last City Pair (Step S453).

Seat availability in each class is determined as follows.

For Best Fare, flights are chosen that have seats available in classes presented to the right of "Y" or an equivalent class on the flight availability screen generated by the CRS. If there are no available seats in the classes to the right of Y-Class, then flights with seats in Y-Class are chosen. If there are no seats in Y-Class, then a second availability screen is requested from the CRS. The selection process then continues in the foregoing manner. If no Y-Class seats are available for any flight on either the first or second CRS availability screen, then no itinerary options for the Travel Request are returned to the reservation software from the node.

For "Coach" and "Business" class, flights are chosen that have seats available in any class to the left of Y-Class or an equivalent class of the CRS flight availability screen. The first class to the left of Y-Class is considered Business Class. If there are no seats available in Business Class, then seats are sold from the class next to the left on the CRS availability display. If there is only one class to the left of Y-Class, then that class is considered First Class and the program proceeds to reserve seats in First Class. Only flights with seats in a class to the left of Y-Class are chosen from the availability display. A second CRS availability display may be used to attempt to fill the three itinerary options. If no Business or First Class seats are available in the desired class, then the node chooses Y-Class. If no seats are available on any of the flights on the CRS availability display, then the node informs the user that there are no seats available for the Travel Request.

For First Class, the node reserves seats from the class that is farthest to the left of the CRS flight availability screen of seat/class availabilities. The node employs the same method for choosing flights as for Business Class.

In general, as the user enters more City Pair lines, each line is passed across the API when the user finishes modifying it. An availability display is then requested from the CRS. The software attempts to select another three flight alternatives and add those to the three PNRS.

Figure 4D:
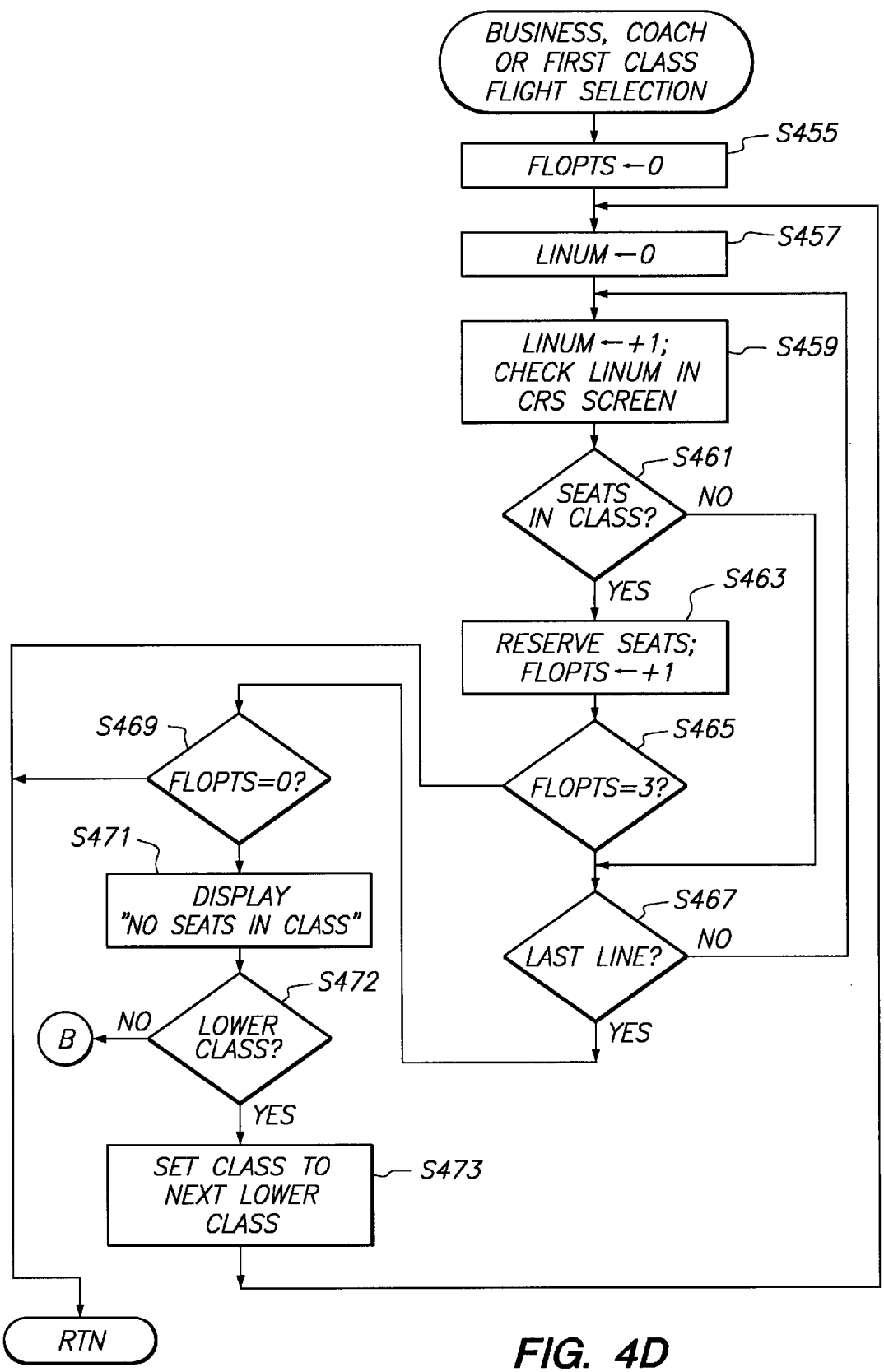

Referring to FIG. 4D, flight selection for Coach, Business Class and First Class will first be described in detail, after which flight selection for Best Fare will be further described.

When the flight class is not Best Fare, the software generally picks the first three flights that have seats available in an appropriate class from the availability display as it did for the first City Pair, or the first three flights on airlines corresponding to those designated by the user in the profile (if any), and adds them to the PNRs. More particularly, in Step S455, a line counter LINUM is set to zero. In the following step (Step S459), LINUM is incremented, and the corresponding line of the CRS availability display is checked. If seats are found in the desired class (Step S461), then the seats are reserved (Step S463), and a counter FLOPTS, used to keep track of the number of flight options found thus far, is incremented. If the desired number of flight options, assumed here to be three, has been found (Step S465), the selection concludes. If not, then a determination is made whether the last line of the CRS availability display has been reached (Step S467). If not, the program flow returns to Step S459, LINUM is incremented, etc. If the last line has been reached, then a determination is made whether or not any flight options were found (Step S469). If one or more flight options in the desired class were found, then selection concludes. If not, a message is generated to the user that there are no seats in the desired class (Step S471). If there is a lower class (Step S472), then the desired class is lowered (Step S473) and the process is repeated beginning at Step S457. If there is no lower class, then a message is generated to the user that the request cannot be satisfied (path B).

Alternatively, one or more additional availability screens may be checked in an effort to satisfy the request.

When the flight class is Best Fare, the software searches through the availability display and attempts to find the first flight that is on the same airline as that of the first City Pair flight chosen for a particular PNR that has seats available in Y-Class or equivalent and lower-price classes. If no flight on the previous segment's airline can be found, the program chooses one of the first flights in the display that has class Y seats available that is not being assigned to another PNR, regardless of the flight's airline. The chosen flights are added to the PNRs, as above.

Figure 5:
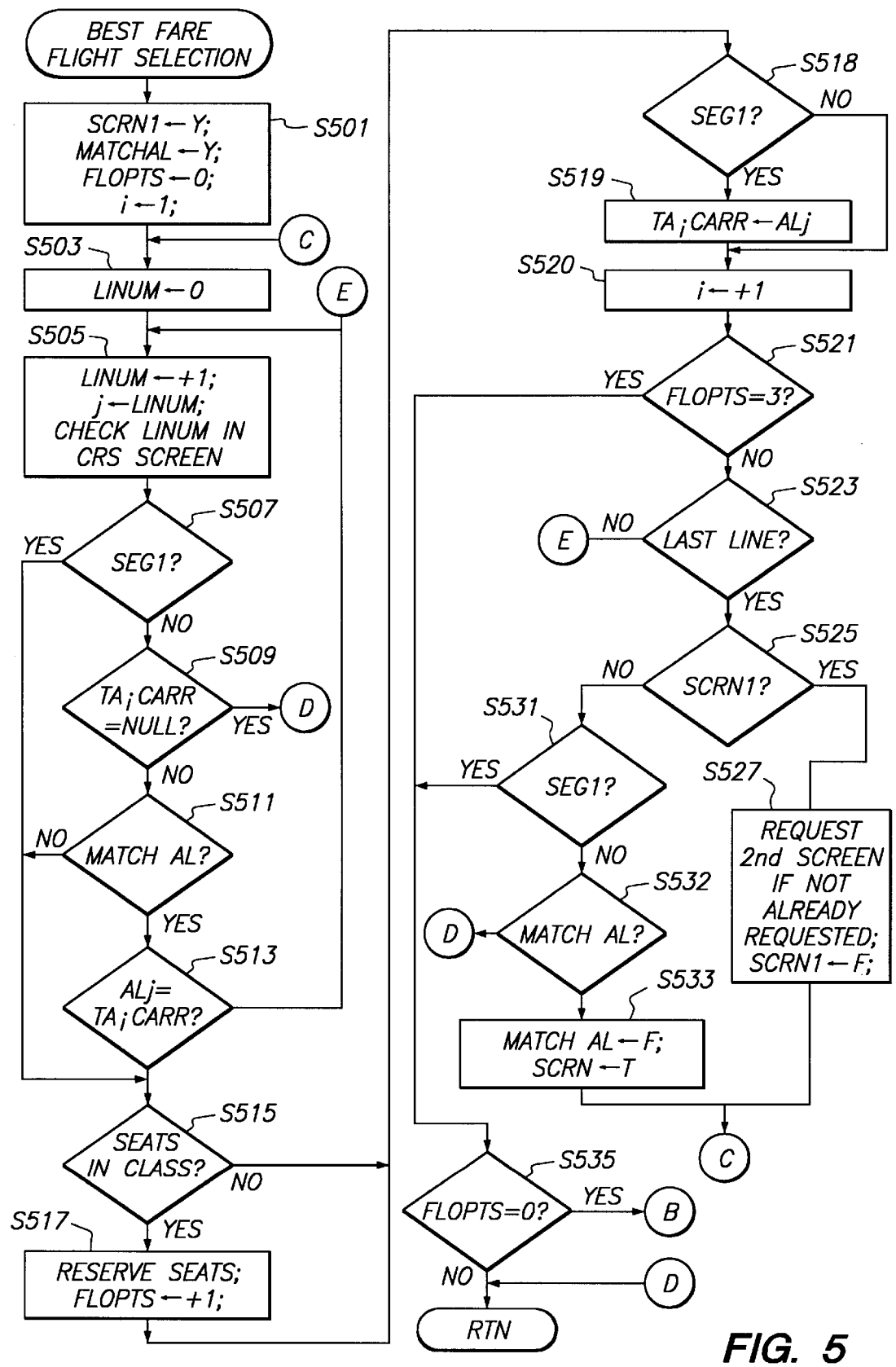
FIG. 5 is a flow chart illustrating flight selection when Best Fare has been chosen.

Referring more particularly to FIG. 5, in Step 501, FLOPTS is set to zero. An additional variable I is provided. It is used as a TA counter and is initialized to one. Also several flags are provided. A flag SEG1, set in Step S443 of FIG. 4C, identifies whether or not selection is for the first segment. A flag SCRN1 identifies whether the availability screen is the first availability screen requested for a segment. A flag MatchAL identifies whether a flight is to be found on the same airline as a previous segment. All of the flags are initialized to True (Y). Also, a record is kept of the carrier for the first segment for each of the TAs. The carrier values are initialized to NULL in Step S443 of FIG. 4C. In the following Step S503, LINUM is set to zero.

In Step S505, LINUM is incremented, and the corresponding line of the CRS availability display is checked. Also, a counter variable j is assigned the value of LINUM. At this point, SEG1, initialized to true, remains true, and program flow proceeds to step S515, in which the program looks for seats in the requested class (coach). If seats are found, they are reserved (Step S517). Then in Step S518, a determination is made whether SEG1 remains true. If so, then the carrier for TAi is set to the airline ALj of the current display line (Step S519). The counter I is then incremented (Step S520).

If three flight options have been found (Step S521), the program returns. Otherwise, a determination is made whether or not the current display line is the last (Step S523). If not, then program flow resumes at step S505, in which the next line is checked, etc.

If three flight options have not been found and the current display line is the last, a determination is made whether or not the CRS screen is the first. If so, a second CRS screen is requested, and SCRN1 is set to false (Step S527). Program flow then resumes at Step S503, in which LINUM is set to zero.

It may happen that three flight options are not found within the first two CRS screens. If so, and if the segment is still the first segment (Step S531), then the program returns, unless no flight options have been found (Step 535), in which case program proceeds to point B in FIG. 4B.

During subsequent segments after the first segment, SEG1 is false. Assuming that at least one flight option was found during flight selection for the first segment, then in Step S509, the carrier for the first TA will not be null. Furthermore, MatchAL will be true (Step S511). Therefore, the airline on each line of the CRS display will be compared with the TA carrier in search of a match. Once a match is found, then the program check to see whether there are seats in the desired class (Step S515). If so, they are reserved (Step S517). SEG1 being false (Step S518), the TA carriers remain as previously assigned (Step 519), but the counter I is incremented (Step S520).

When the last line of the first screen is reached (Step S523), if three flight options for the current segment have not been found (Step S521), then in Step S527, a second screen is requested if it has not been already, SCRN1 is set to false, and program flow resumes at Step S503.

Even so, three flight options may not have been found when the last line of the second screen has been reached. That is, the decision blocks of Steps S521, S532 and S525 may yield N, Y, and N, respectively. In order to present three complete priced itineraries if possible, in subsequent segments after the first segment (Step S531 yields N), the constraint of airline matching, if it has not been already (Step S533), is relaxed by setting MatchAL to false. SCRN1 is set to true, and program flow resumes at Step S503. If the constraint of airline matching has already been relaxed, then the program returns.

As previously described, when the user has finished entering City Pairs, the pricing phase will be entered by the software. Each of the PNRs and their associated itineraries will be priced by the CRS. The three itinerary options and their prices will then be sent back through the API to the Reservation software program for display to the user, who may pick and reserve exactly one of them. When the user is finished picking an itinerary option or canceling the itinerary, any unneeded PNRs will be canceled at the CRS.

If the CRS refuses to price an itinerary, this information will be passed through the API to Reservation software. The reservation software will either display the price, or indicate to the user that a price could not be generated.

When no itinerary option can be generated for a Travel Request, the user will be informed immediately. A dialog with the failed status of the request will be created whether or not the user has clicked on the "Book Itinerary" button.

It will be appreciated that the present invention can be embodied in other specific forms without departing from the spirit or essential character thereof. The disclosed embodiments are therefore considered in all respects to be illustrative and not restrictive. The scope of the invention is indicated by the appended claims, and all changes which come within the meaning and range of equivalents thereof are intended to be embraced therein.

What is claimed is:

1. A computer-implemented method of building a travel itinerary for a multiple-segment travel request, said method comprising the steps of:

receiving from a user information concerning a first segment of said multiple-segment travel request:

establishing multiple connections to a computerized reservation system;

using at least one connection, requesting and receiving from said computerized reservation system availability information for said first segment, said availability information identifying travel options with each of multiple carriers;

selecting multiple travel options for said first segment;

communicating selection of said multiple travel options to said computerized reservation system using said multiple connections;

receiving from a user information concerning a next segment of said multiple-segment travel request;

using at least one connection, requesting and receiving from said computerized reservation system availability information for said next segment, said availability information identifying travel options with each of multiple carriers;

selecting multiple travel options for said next segment;

communicating selection of said multiple travel options to said computerized reservation system using said multiple connections; and combining in one-to-one correspondence selected ones of said travel options for said next segment with selected ones of said travel options for said first segment to form multiple distinct itineraries.

2. The method of claim 1, comprising the further steps of, for each additional segment:

receiving from a user information concerning a next segment of said multiple-segment travel request;

requesting and receiving from said computerized reservation system availability information for said next segment, said availability information identifying travel options with each of multiple carriers;

selecting multiple travel options for said next segment; and combining in one-to-one correspondence selected ones of said travel options for said next segment with selected ones of said travel options for a preceding segment to form multiple distinct itineraries.

3. The method of claim 2, comprising the further steps of:

pricing said multiple distinct itineraries to form multiple priced distinct itineraries;

displaying said multiple priced distinct itineraries to said user; receiving a selection from said user of one of said multiple priced distinct itineraries; and booking one of said multiple priced distinct itineraries.

4. A method processing a multiple-segment travel request comprising the steps of:

receiving from a user information concerning a segment of said multiple-segment travel request;

based on said information generating multiple distinct reservation requests to a computerized reservation system each relating to said segment and communicating said multiple distinct requests to said computerized reservation system substantially simultaneously using multiple connections; and processing in parallel at said computerized reservation system said distinct requests relating to said segment.

5. A reservation system for processing a multiple-segment travel request, comprising:

means for receiving from a user information concerning a segment of said multiple-segment travel request;

means for, based on said information, generating multiple distinct reservation requests to a computerized reservation system each relating to said segment and communicating said multiple distinct requests to said computerized reservation system substantially simultaneously using multiple connections; and means for processing in parallel at said computerized reservation system said distinct requests relating to said segment.

* * * * *